United States Patent
Li et al.

(10) Patent No.: US 12,105,998 B2
(45) Date of Patent: Oct. 1, 2024

(54) IMAGE FORMING DEVICE-BASED UNBINDING CONTROL METHOD AND IMAGE FORMING DEVICE

(71) Applicant: Zhuhai Pantum Electronics Co., Ltd., Zhuhai (CN)

(72) Inventors: Jiade Li, Zhuhai (CN); Weifeng Tan, Zhuhai (CN); Xinping Li, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 18/151,237

(22) Filed: Jan. 6, 2023

(65) Prior Publication Data
US 2023/0221904 A1  Jul. 13, 2023

(30) Foreign Application Priority Data
Jan. 7, 2022 (CN) .......................... 202210015339.3

(51) Int. Cl.
*G06F 3/12* (2006.01)

(52) U.S. Cl.
CPC .......... *G06F 3/1236* (2013.01); *G06F 3/1222* (2013.01); *G06F 3/1238* (2013.01); *G06F 3/1285* (2013.01)

(58) Field of Classification Search
CPC .... G06F 3/1236; G06F 3/1222; G06F 3/1238; G06F 3/1285
See application file for complete search history.

(56) References Cited

U.S. PATENT DOCUMENTS

| | | | |
|---|---|---|---|
| 2016/0191266 A1* | 6/2016 | Ren | H04L 12/2809 370/254 |
| 2017/0177607 A1* | 6/2017 | Fahey | G06F 21/6218 |
| 2017/0344321 A1* | 11/2017 | Li | G06F 3/1292 |
| 2018/0032297 A1* | 2/2018 | She | G06F 3/1238 |
| 2020/0162636 A1* | 5/2020 | Yoshihashi | H04L 63/0807 |
| 2020/0410122 A1* | 12/2020 | Alacar | H04L 67/565 |
| 2021/0006677 A1* | 1/2021 | Ushinohama | H04N 1/00474 |
| 2022/0107767 A1* | 4/2022 | Chida | G06F 3/1239 |
| 2022/0277367 A1* | 9/2022 | Takeichi | G06Q 30/0601 |
| 2023/0097212 A1* | 3/2023 | Kapale | H04W 8/26 455/414.1 |
| 2023/0168848 A1* | 6/2023 | Yamamoto | G06F 3/121 358/1.14 |

(Continued)

FOREIGN PATENT DOCUMENTS

| CN | 107872787 A | 4/2018 |
|---|---|---|
| CN | 109219036 A | 1/2019 |

(Continued)

*Primary Examiner* — Benjamin O Dulaney
(74) *Attorney, Agent, or Firm* — ANOVA LAW GROUP PLLC

(57) ABSTRACT

A method is provided to exert unbinding control on an image forming device. The method includes: obtaining an unbinding instruction; sending a first unbinding request to the server according to the unbinding instruction, where the unbinding request includes identification information of the image forming device; obtaining a reply message from the server in response to the unbinding request; and in response to a determination that the reply message indicates unbinding failure, automatically sending a second unbinding request to the server.

20 Claims, 7 Drawing Sheets

(56) References Cited

U.S. PATENT DOCUMENTS

2023/0205403 A1* 6/2023 Tao ................... G06F 3/1224
                                                    715/753
2023/0345273 A1* 10/2023 Peng ................... H04W 28/10

FOREIGN PATENT DOCUMENTS

| CN | 112214185 A | 1/2021 |
| CN | 112532805 A | 3/2021 |

* cited by examiner

IMAGE FORMING DEVICE-BASED UNBINDING CONTROL METHOD AND IMAGE FORMING DEVICE

RELATED APPLICATION(S)

This application claims priority to Chinese Patent Application No. 202210015339.3 filed with the National Intellectual Property Administration, PRC on Jan. 7, 2022, which is incorporated herein by reference in entirety.

FIELD OF THE TECHNOLOGY

The present disclosure relates to the technical field of image forming, and in particular to an image forming device-based unbinding control method, an image forming control device, an image forming device, an electronic device, and a computer storage medium.

BACKGROUND

In an existing scenario, when a user wishes to use an image forming device, the user establishes an association relationship with the image forming device on the server side, which is called "binding." By way of binding, the user associates at the server the server account the user uses to log into the server with the identification information of the image forming device. The server may obtain the identification information of the image forming device by using an application program installed on the user's mobile terminal, where the two-dimensional code located on the body of the image forming device is scanned and the identification information of the image forming device contained in the two-dimensional code is sent to the server. The two-dimensional code may be directly printed on a label attached to the image forming device, or otherwise displayed in a visible form on the image forming device.

This binding method may be presented with certain security risks. For example, the server lacks adequate control when performing the association operation of user information and the identification information of the image forming device, which may cause the image forming device to be remotely bound to a malicious user, who may seek malicious assess to the image forming device. To solve this technical problem, the image forming device may be triggered to initiate an unbinding request to the server to unbind the image forming device. However, certain existing solutions are not readily capable of determining whether the unbinding of the image forming device has succeeded. When the unbinding fails, the user does not know that the image forming device is still maliciously bound by other users later when the use wishes to use the image forming device. The user may have to repeatedly trigger the image forming device to initiate an unbinding request to the server, which causes inconvenience to the user.

SUMMARY

To help solve the technical problem that the failure of the server to unbind the image forming device and the user information causes inconvenience to the user, the present disclosure in certain embodiment(s) provides an image forming device-based unbinding control method, an image forming control device, an image forming device, an electronic device, and a computer storage medium.

In one aspect, the present disclosure provides a method of unbinding control on an image forming device, the method including: obtaining a first unbinding instruction; sending an unbinding request to a server according to the unbinding instruction, where the unbinding request includes identification information of the image forming device; obtaining a reply message from the server in response to the unbinding request; and in response to a determination that the reply message indicates unbinding failure, automatically sending a second unbinding request to the server.

In another aspect, the present disclosure provides an image forming device, including: a memory; and a processor coupled to the memory and configured to perform: obtaining an unbinding instruction; sending an unbinding request to a server according to the unbinding instruction, where the unbinding request includes identification information of the image forming device; obtaining a reply message from the server in response to the unbinding request; and in response to a determination that the reply message indicates unbinding failure, automatically sending a second unbinding request to the server.

In yet another aspect, the present disclosure provides a non-transitory computer-readable storage medium storing computer program instructions executable by at least one processor to perform: obtaining an unbinding instruction; sending an unbinding request to a server according to the unbinding instruction, where the unbinding request includes identification information of the image forming device; obtaining a reply message from the server in response to the unbinding request; and in response to a determination that the reply message indicates unbinding failure, automatically sending a second unbinding request to the server.

The technical solutions provided by certain embodiment(s) of the present disclosure reflect the following beneficial effects.

1. Once the image forming device is triggered to send an unbinding request to the server, and when it is determined that the reply message to the unbinding request is unbinding failure, the image forming device automatically sends an unbinding request to the server without user intervention, to bring convenience to the user.

2. Before sending the unbinding request to the server, inquiry is made as to whether there is user information that has a binding relationship with the image forming device, and when such binding relationship is determined to exist, the unbinding request is sent to the server. This operation avoids ineffective communication between the image forming device and the server.

BRIEF DESCRIPTION OF THE DRAWINGS

To illustrate the technical solutions of the embodiment(s) of the present disclosure more clearly, the accompanying drawings are described herein. The accompanying drawings referred to in the following description are directed to certain embodiment(s) of the present disclosure. Those of ordinary skill in the art may also obtain other drawings based on these drawings without necessarily have to exert creative labor.

DETAILED DESCRIPTION

Figure 1:
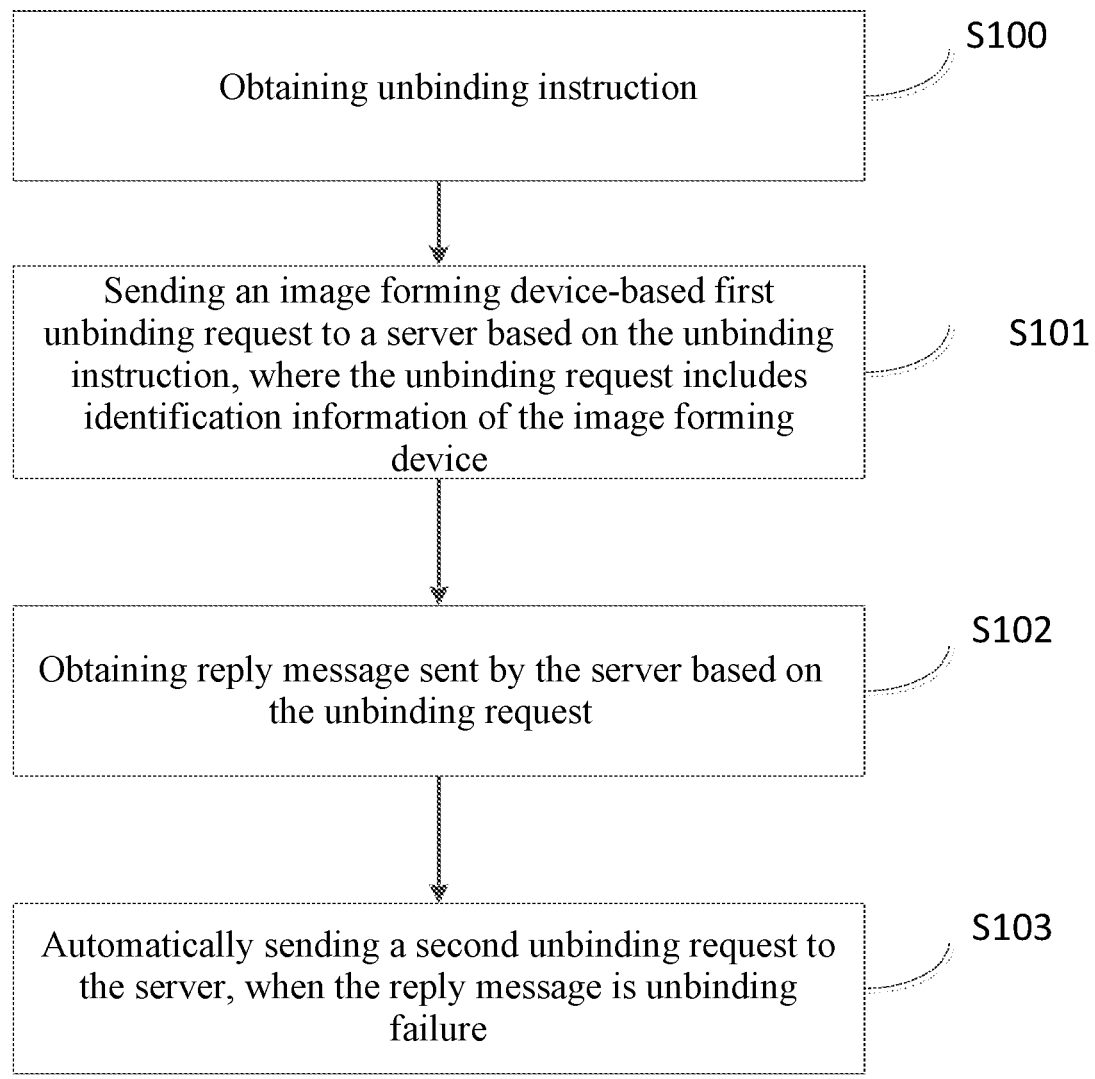
FIG. 1 schematically shows a method of unbinding control on an image forming device according to certain embodiment(s) of the present disclosure.

To better understand the technical solutions of the present disclosure, embodiments of the present disclosure are described below in conjunction with the accompanying drawings.

What is described herein reflects some but not all embodiments of the present disclosure. Based on certain embodiment(s) of the present disclosure, other embodiments obtained by persons of ordinary skill in the art without creative work belong to the protection scope of the present disclosure.

Implementation Example One

In certain embodiment(s), the image forming device is used to perform image forming operations, such as generating, printing, receiving, and sending image data. Examples of the image forming device include: inkjet printers, laser printers, LED (Light Emitting Diode) printers, copiers, fax machines, scanners or all-in-one machines, and multi-function peripherals (MFP, Multi-Functional Peripheral) that perform multiple functions in a single device. The image forming device includes an image forming control unit and an image forming unit, where the image forming control unit is used to control the image forming device as a whole, and the image forming unit is used to process the transmitted image based on the image data and form image on the transmitted paper.

The image forming control unit may be an SoC (System on Chip, device on chip). SoC is a miniature device, includes a plurality of parts, and is configured to control the imaging processing operation of the image forming device. The image processing operation includes, for example, linear correction, noise reduction, bad pixel removal, and detail enhancement, which are performed on the image data to improve the quality of image output. The image formation control unit is also used to perform engine control-related processing operations such as data sending and receiving, command sending and receiving, and portraits-printing portraits. The processing operations include sending and receiving data, printing engine control commands, and printing status through the interface unit (including but not limited to USB port, wired network port, wireless network port or other interfaces).

In certain embodiment(s), the identification information of the image forming device includes characteristic information of the image forming device, such as MAC address, serial number, and model. The present disclosure does not intent to limit on the type or number of the characteristic information, which may further include information about the organization to which the image forming device belongs, where the organization may be a company, an enterprise, an institution, a region, a team, a department, or the like.

In certain embodiment(s), the server may be a server provided by an image forming device manufacturer, or a server provided by a third-party manufacturer, such as a third-party server corresponding to a third-party application program such as DingTalk, WPS, QQ, WeChat, or the like.

In certain scenarios, when a user wants to use an image forming device, the user establishes an association relationship with the image forming device on the server side, which is named "binding" for the purpose of description herein. For binding, the user logs in to the server, and associates the user account with the identification information of the image forming device at the server side. One way for the server to obtain the identification information of the image forming device is through scanning the two-dimensional code located at the body of the image forming device with an APP program installed on the user's mobile terminal, so that the identification information of the image forming device contained in the two-dimensional code information is transmitted to the server. The two-dimensional code may be directly printed on a label attached to the image forming device, or displayed on the image forming device in other suitable and visible form.

Such a binding method is met with potential security risks. The server lacks control when performing the associated storage of user information and the identification information of the image forming device, which may cause the image forming device to be remotely bound with a malicious user, and hence a malicious use of the image forming device. To solve this problem and reduce such risk, the image forming device may be triggered to initiate an unbinding request to the server to unbind the image forming device. However, certain existing solutions may not determine whether the unbinding of the image forming device has indeed succeeded. When the unbinding fails, only when the user uses the image forming device later, will he then realize that the image forming device is still maliciously bound by other users. At that time of future use, the user will reinitiate the unbinding request to trigger the image forming device to transmit another unbinding request to the server, which results in unsatisfactory user experience.

To solve certain of these technical problems, the present disclosure provides, in view of FIG. 1, an unbinding control method based on an image forming device. The execution entity of the method is the image forming device, and in particular an image forming control unit built in the image forming device. The method includes one or more of the following steps.

S100: Obtaining an unbinding instruction.

S101: Sending an unbinding request on the image forming device to a server according to the unbinding instruction, where the unbinding request includes identification information of the image forming device.

S102: Obtaining a reply message sent by the server in response to the unbinding request.

S103: When the reply message indicates unbinding failure, automatically sending a second unbinding request to the server.

In S100, the unbinding instruction may be obtained as follows.

1. The user operates preset options on the user interface corresponding to the image forming device in a preset manner, thereby receiving the unbinding instruction. The user interface includes a user interface of an operation panel of the image forming device, a driver application user interface, or a webpage user interface.

2. Via the mobile terminal, sending a preset instruction to the image forming device, to receive the unbinding instruction.

The preset instruction may be a short press, a long press, or a selection. The present disclosure does not limit the form or type of the preset instruction. When the user interface is the operation panel of the image forming device, the preset option may be a button on the operation panel of the image forming device or an option or multiple options in the menu, which may be a physical button or a virtual button. The present disclosure does not limit the form or type of the preset option.

The preset option may be a button or an option with multiple functions on the image forming device. When the preset option is triggered in different ways, the image forming device performs different functions accordingly. For example, when the preset option is activated in a first way or first manner, the image forming device acquires the unbinding instruction.

The mobile terminal may be a mobile phone, a smart phone, a tablet computer, a notebook computer, a handheld computer, a vehicle-mounted computer, or any other suitable mobile terminal devices with wireless communication functions.

In S102, the server performs an unbinding operation after receiving the unbinding request sent by the image forming device, and feeds back reply message responsive to the unbinding request to the image forming device, where the reply message may include identification information of the image forming device, user information, and unbinding status information.

In certain embodiment(s), the user information may include only the account information of the user logging into the server, or may also include the account information of the user logging into the server along with information of the organization to which the user belongs. The information of the organization to which the user belongs may include information of the company, the enterprise, the institution, or the department to which the user belongs. The present disclosure does not limit the type or the form of such organization information. The user accesses the server through a web browser or an application program installed on the mobile terminal, or through the user interface of the image forming device, and logs into the server using the user information.

The account information may refer to registration information for identification of users who wish to use the image forming device, and the account information may be registered in batches by the administrator, or may be registered individually by each user. The account information may be registered through the registration interface corresponding to the cloud server, or it may call the registration information used in other social networks, and the cloud server may obtain the registration information after obtaining authorization from other social network servers. When social network registration information is used, when the cloud server manages the user information, and when the current user wishes to register an account belonging to the cloud server itself in the cloud server, the social network registration account information may be made associated with the cloud account information. Accordingly, no matter which account information, the account information is suitable as long as it may be recognized by the server to represent the identity information of the user. The account information may be an individual account or a group account. The present disclosure does not limit on the type or nature of the user account.

In certain embodiment(s), the unbinding state information includes two types of states, namely a success state and a failure state, which are used to represent the unbinding result of the image forming device and the user information. When the number of the user information or the number of users is 1, the unbinding status is solely and directly employed to determine whether the reply message represents unbinding failure. When the number of user information or the number of users is greater than 1, the reply message includes the unbinding status between the image forming apparatus and each piece of user information or each of the users. When the unbinding status between the image forming device and each user information or each user is successful, the reply message is determined to be unbinding success. If the unbinding state between any of all user information or any of the users and the image forming device is failure, then the reply message is determined to be unbinding failure.

In S103, when the reply message is unbinding failure, the image forming device automatically sends an unbinding request to the server. In certain embodiment(s), after determining that the reply message indicates unbinding failure, the image forming device immediately and automatically sends the unbinding request. Alternatively, the image forming device may automatically send an unbinding request to the server, at a preset time interval after determining that the reply message indicates that the unbinding fails.

In certain embodiment(s), after the image forming device automatically sends the unbinding request to the server in S103, if step S200 is performed to obtain the reply message based on the unbinding request, and the reply message is determined to indicate the unbinding success, then the image forming device ceases to automatically send the unbinding request to the server any further.

In certain embodiment(s), after the image forming device automatically sends the unbinding request to the server in S103, if the image forming device receives an instruction to terminate the unbinding, it stops automatically sending the unbinding request to the server.

In certain embodiment(s), once the image forming device determines that the reply message is unbinding failure, a preset flag is set inside the image forming device, thereby triggering the image forming device to automatically send another unbinding request to the server. The another unbinding request may be termed a second unbinding request or a third unbinding request, or the like. If the reply message is that the unbinding is successful, the preset flag is removed or cleared, and the automatic sending of the unbinding request to the server is terminated.

In certain embodiment(s), before the server feeds back the reply message to the image forming device, if there is a successful unbinding status between the user information and the image forming device in the reply message, the server directly notifies that binding between a user token corresponding to the user and the image forming device is removed or released.

In certain embodiment(s), when a user (first user) corresponding to the user information bound to the image forming device shares the image forming device with another user (second user), the binding relationship between the second user and the image forming device is automatically released when the binding relationship between the first user and the image forming device is released. After the unbinding status is successful, the server notifies to the effect that binding between the first user token and the image forming device is released, and that binding between the second user token and the image forming device is released.

In certain embodiment(s), after the image forming device determines that the reply message is unbinding failure, the image forming device automatically sends an unbinding request to the server without user intervention, which brings convenience to the user.

Figure 2:
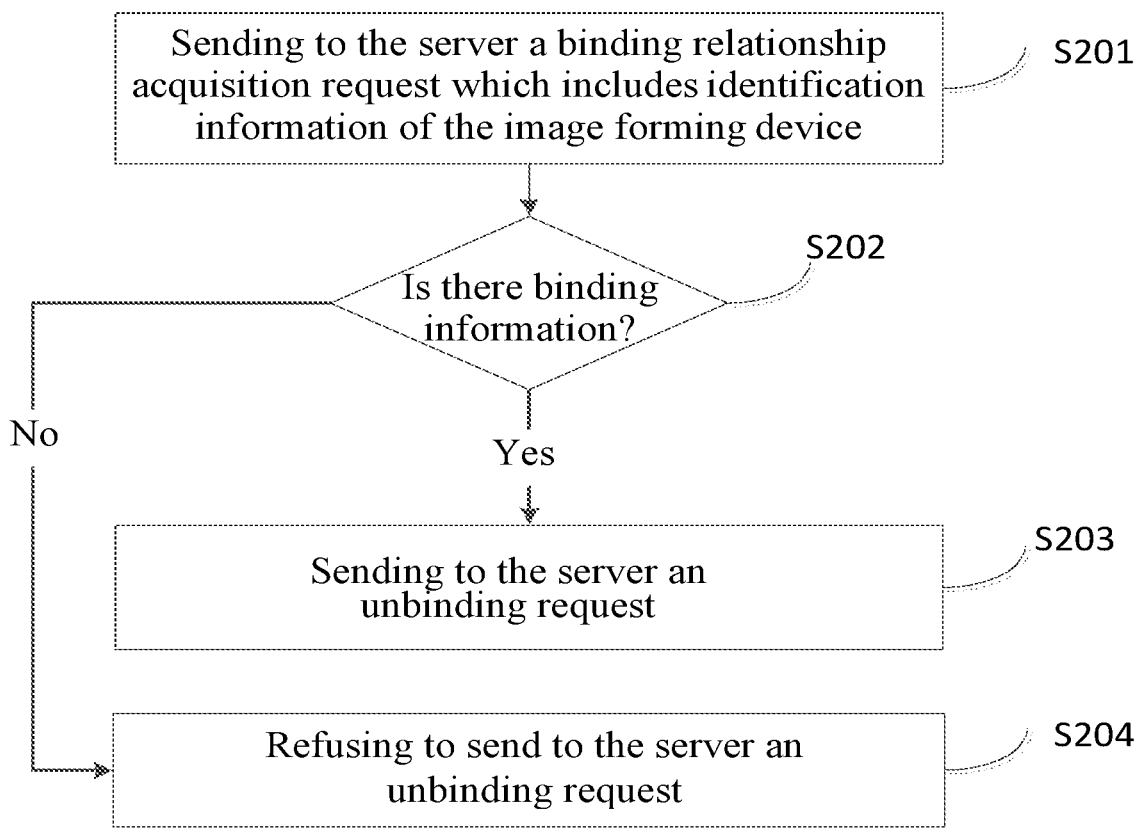
FIG. 2 schematically shows a method of unbinding control on an image forming device according to certain embodiment(s) of the present disclosure.

As shown in FIG. 2, after step S100, one or more the following steps are performed.

S201: Sending a binding relationship acquisition request to the server, the binding relationship acquisition request including the identification information of the image forming device.

S202: Whether there is association information? If yes, performing step S203; and if no, performing step S204.

S203: Sending an unbinding request to the server.

S204: Refusing to send an unbinding request to the server.

In certain embodiment(s), step S201 may be executed after the preset option on the user interface corresponding to the image forming apparatus is triggered or an instruction sent by the mobile terminal is received.

In certain embodiment(s), before sending the unbinding request to the server, it is first judged whether there is an association relationship in the server. If the association relationship is present in the server, the unbinding request is sent to the server; and if the association relationship is absent in the server, sending of the unbinding request to the server is refused to avoid unnecessary communication between the image forming device and the server.

Figure 3:
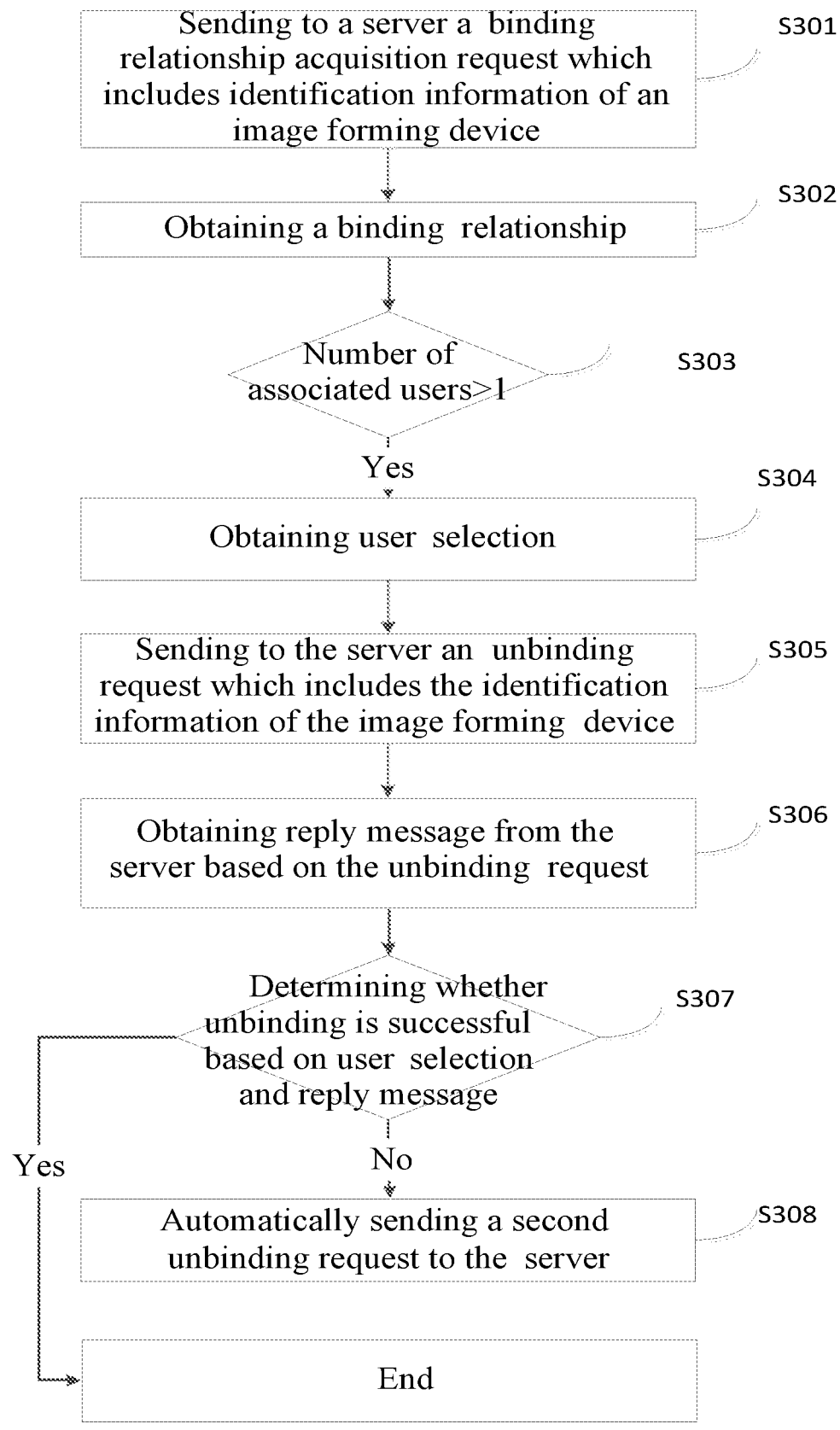
FIG. 3 schematically shows a method of unbinding control on an image forming device according to certain embodiment(s) of the present disclosure.

As shown in FIG. 3, the unbinding control method provided according to certain embodiment(s) of the present disclosure may also include one or more of the following steps:

S301: Sending a binding relationship acquisition request to the server, where the binding relationship acquisition request includes identification information of the image forming device.

S302: Obtaining the binding relationship.

S303: Determining the number of associated users or the number of pieces of associated user information is greater than 1. If yes, executing step S304.

S304: Obtaining a user selection.

S305: An unbinding request is sent to the server, where the unbinding request includes identification information of the image forming device.

S306: Acquiring reply message sent by the server based on the unbinding request.

S307: Determining whether the unbinding is successful based on the user selection and the reply message. If no, executing step S308; and if yes, ending the process.

S308: Automatically send an unbinding request to the server.

Step S301 may be executed after the preset option on the user interface corresponding to the image forming apparatus is triggered or an instruction sent by the mobile terminal is received.

In S304, the user may select user information on a user interface of the image forming device, and the user interface may be a user interface of an operation panel of the image forming device, a driver user interface of an application program, or a webpage user interface. Alternatively, the user may select on the user interface of the mobile terminal that directly or indirectly communicates with the image forming device, and the user interface may include the user interface of the application program installed on the mobile terminal.

In certain embodiment(s), the server feeds back the binding relationship to the image forming device or to the mobile terminal that directly or indirectly communicates with the image forming device, and the user selects the user information on the user interface of the image forming device or the user interface of the mobile terminal.

In S307, based on the reply message and user selection, it is determined whether the unbinding is successful. When the number of pieces of user information or the number of users is greater than 1, the reply message includes the unbinding status between the image forming apparatus and each piece of user information or each of the users. In certain embodiment(s), when the unbinding state between the user information selected by the user and the image forming device is successful, it is determined that the reply message is unbinding success; and when the unbinding state between the user information selected by the user and the image forming device is not successful, it is determined that the reply message is unbinding failure. For example, the user information in the binding relationship is 0001, 0002, 0003, and 0004, and the user selects 0001 and 0002 at step S304. At step S306, the unbinding status a between the user information 0001 and the image forming device and the unbinding state b between the user information 0002 and the image forming device are obtained, respectively. Assuming that the unbinding state a is successful and the unbinding state b is successful, then it is determined that the unbinding status of the reply message sent by the server is successful; and if as long as any one of the unbinding state a and the unbinding state b is failure, then it is determined that the reply message is failure.

The unbinding request at step S305 may include only the identification information of the image forming device, or may include not only the identification information of the image forming device but also user information selected by the user. When the unbinding request at step S305 includes only the identification information of the image forming device, the reply message received from the server at step S306 may include the unbinding state of all user information that has a binding relationship with the image forming device. The image forming apparatus determines whether the reply message is unbinding failure based only on the unbinding state between the user information selected by the user and the image forming device. When the unbinding request at step S305 only includes the identification information of the image forming apparatus and the user information selected by the user, the reply message received from the server at step S306 only involves the unbinding status between the user information selected by the user and the image forming device, whereby it is determined whether the reply message is unbinding failure directly based on the unbinding status between the user information selected by the user and the image forming device.

At step S307, once it is determined that the reply message is unbinding failure, the image forming device automatically sends an unbinding request to the server. The unbinding request may only include the identification information of the image forming device, or may include not only the identification information of the image forming device but also user information whose unbinding status relative to the image forming device is failure. If the user information selected by the user is 0001 and 0002, if the unbinding state between the user information 0001 and the image forming device obtained at step S306 is failure, the unbinding state between the user information 0002 and the image forming device is successful, then the unbinding request sent to the server at step S308 may only include the identification information of the image forming device and user information 0001. The unbinding request may also include the identification information of the image forming apparatus and the user information 0001 and 0002 selected by the user.

Figure 4:
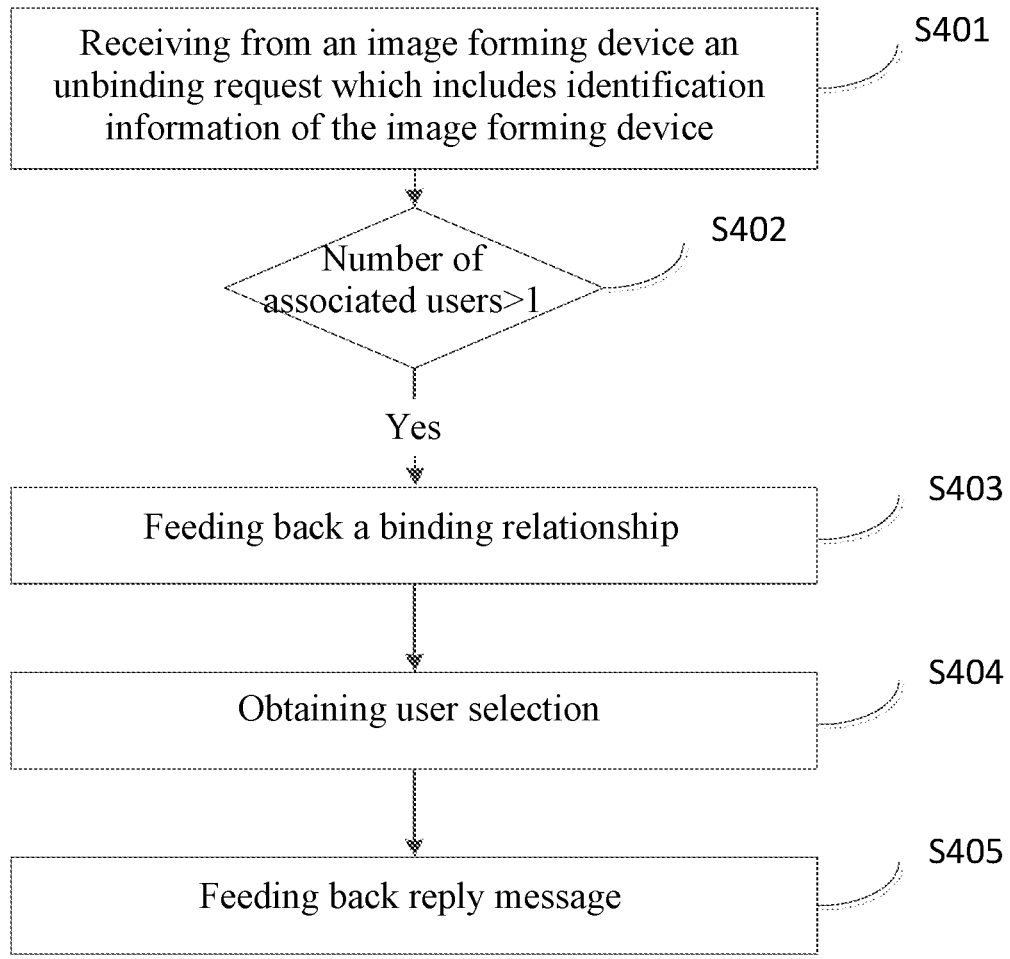
FIG. 4 schematically shows a method of unbinding control on an image forming device according to certain embodiment(s) of the present disclosure.

At step S303, when the number of associated user(s) or number of piece(s) of associated user information is only 1, an unbinding request is directly sent to the server, and the unbinding request may only include the identification information of the image forming device, or may include the identification of the image forming device and the user information. The reply message sent by the server based on the unbinding request is obtained, and the reply message may only include the unbinding status of the image forming device and the user information. If the unbinding status is successful, then it is determined that the reply message is success, and if the unbinding status is failure, then the reply message is failure. When the reply message is failure, another unbinding request is automatically sent to the server, the unbinding request may only include the identification information of the image forming device, or may include the identification information of the image forming device and also the user information As shown in FIG. 4, the present disclosure provides an unbinding control method, applied to a server, and the method includes one or more of the following steps.

S401: Receiving an unbinding request sent by the image forming device, where the unbinding request includes identification information of the image forming device.

S402: Determining the number of associated user information or the number of associated users is greater than 1. If yes, performing step S403.

S403: Feeding back a binding relationship.

S404: Receiving a user selection.

S405: Feeding back a reply message.

When the server determines that the number of user information associated with the image forming device is greater than 1, the server feeds back the binding relationship to the image forming device for the user to choose, then performs an unbinding operation based on the user's selection, and feeds back reply message to the image forming device. The reply message received by the image forming device only includes the unbinding status between the user information selected by the user and the image forming device, and the image forming device determines that the reply message is a failure to unbind, and then automatically sends the unbinding request to the server. The unbinding request may only include the identification information of the image forming device, or may include the identification information of the image forming device and also user information whose unbinding status relative to the image forming device is failure.

Figure 5:
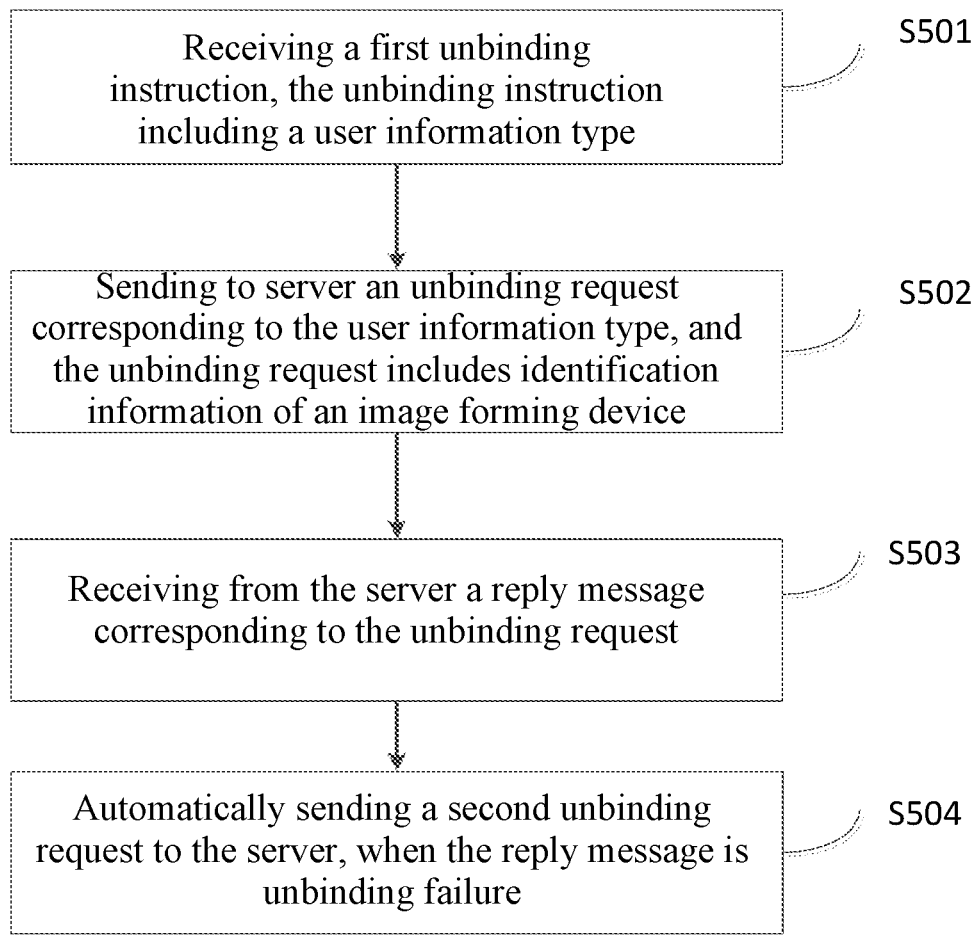
FIG. 5 schematically shows a method of unbinding control on an image forming device according to certain embodiment(s) of the present disclosure.

Described herein is the unbinding control method when there are multiple servers corresponding to the user information associated with the image forming device, as shown in FIG. 5, and the unbinding control method includes one or more of the following steps.

S501: Receiving an unbinding instruction, the unbinding instruction includes a type of user information.

S502: Sending an unbinding request to the server corresponding to the user information type, and the unbinding request includes the identification information of the image forming device.

S503: Receiving a reply message sent by the server based on the unbinding request.

S504: When the reply message is unbinding failure, automatically sending an unbinding request to the server.

The user information types is related to the server corresponding to the user information. For example, the user information type is used to represent third-party servers corresponding to application programs such as WeChat, DingTalk, WPS, QQ, or servers corresponding to image forming device manufacturers.

In certain embodiment(s), the image forming device may receive the unbinding instruction directly through a relevant interface of the image forming device, or receive the unbinding instruction through a mobile terminal communicating with the image forming device.

The image forming device determines a target server based on the type of user information included in the unbinding instruction as received, and sends an unbinding request to the target server, where the unbinding request includes the identification information of the image forming device. The image forming device receives a reply message fed back from the target server, determines that the unbinding is failed according to the reply message, and automatically sends an unbinding request to the target server. The target server may be a server corresponding to the image forming device manufacturer and/or a third party server. The image forming device sends the unbinding request to the target server. The image forming device may directly send the unbinding request to the target server, or the image forming device may send the unbinding request to the target server through another server.

In certain embodiment(s), before step S502, one or more of the following steps may be performed.

Step 1: Sending a binding relationship acquisition request to the target server, where the binding relationship acquisition request includes the identification information of the image forming device.

Step 2: Is there associated information?

If yes, proceeding to step 3; and if no, proceeding to step 4.

Step 3: determining to send an unbinding request to the target server.

Step 4: Refusing to send the unbinding request to the server.

Thus, invalid or unnecessary communication between the image forming apparatus and the target server may be avoided.

Description relevant to step S504 may be found in the description herein elsewhere, and is not repeated here for brevity.

In certain embodiment(s), after step S501, one or more of the following steps may be performed.

Step A: Sending a binding relationship acquisition request to the target server, where the binding relationship acquisition request includes the identification information of the image forming device.

Step B: Obtaining the binding relationship.

Step C: Determining the number of associated user information or the number of associated users is greater than 1.

If yes, proceeding to step D.

Step D: Obtaining a user selection.

Step E: Sending an unbinding request to the target server, where the unbinding request includes the identification information of the image forming device.

Step F: Obtaining the reply message sent by the server based on the unbinding request.

Step G: Determining whether the unbinding is successful based on the user selection and reply message.

If no, performing step H; and if yes, ending the procedure.

Step H: Automatically sending an unbinding request to the server.

Corresponding description may be found in description relevant to FIG. 3, and is not repeated herein for brevity.

Figure 6:
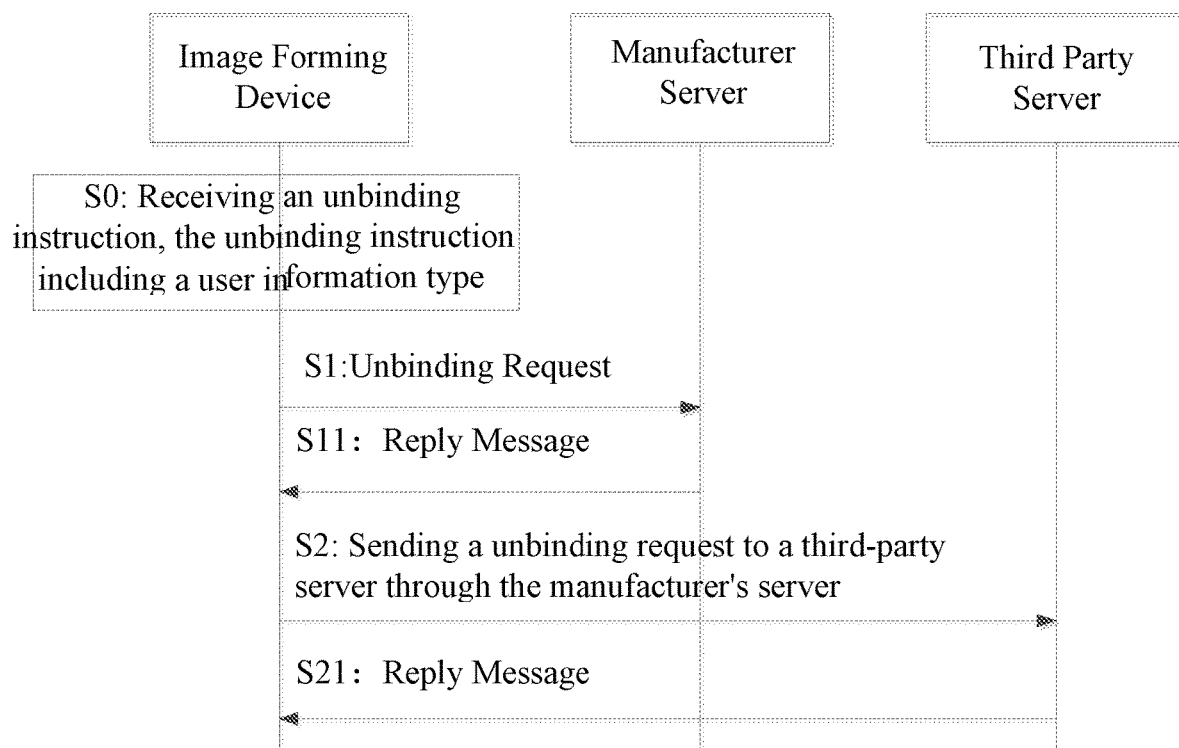
FIG. 6 schematically shows a method of unbinding control on an image forming device according to certain embodiment(s) of the present disclosure.

In certain embodiment(s), in view of FIG. 6, a method for unbinding includes one or more of the following steps.

S0: The image forming device obtains the unbinding instruction, the unbinding instruction includes a type of user information corresponding to the manufacturer's server and the third-party server respectively, and the image forming device communicates with the third-party server through the manufacturer's server.

S1: The image forming device sends an unbinding request to the manufacturer server.

S11: The image forming device receives reply message from the manufacturer server.

S2: The image forming device sends an unbinding request to a third-party server through the manufacturer's server.

S21: The third-party server sends a reply message to the image forming device through the manufacturer's server.

The image forming device determines whether the reply message sent by the manufacturer's server and the reply message sent by the third-party server indicate unbinding failure, and automatically sends an unbinding request to the corresponding server when the unbinding fails.

In certain embodiment(s), a disassociation between the user information and the image forming device identifier may mean that the server directly deletes the association between the user information and the image forming device identifier, where the user information and the image forming device may remain at the server, or may be deleted along with the deletion of the association. Alternatively, the association is not deleted at the server, and instead, the association between the user information and the image forming device is rendered invalid or ineffective.

Implementation Example Two

Figure 7:
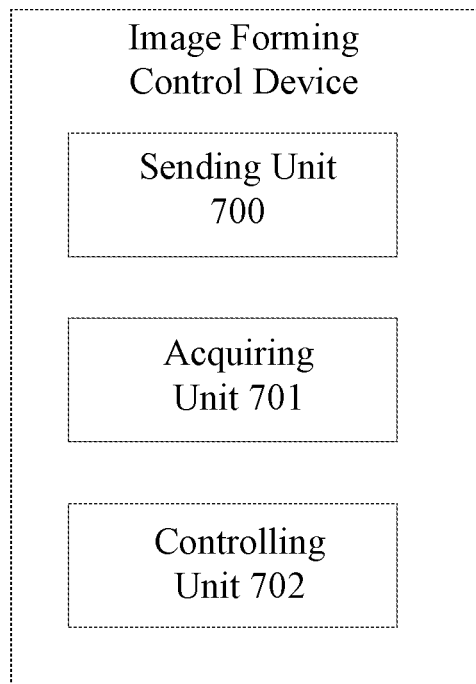
FIG. 7 schematically depicts a structure of an image forming device according to certain embodiment(s) of the present disclosure.

As shown in FIG. 7, the present disclosure in certain embodiment(s) provides an image forming control device, including: an acquiring unit 701, configured to acquire an unbinding instruction; a sending unit 700, configured to send an image forming device-based unbinding request to the server based on the unbinding instruction acquired by the acquiring unit 701, where the unbinding request includes identification information of the image forming device; an acquiring unit 701, configured to acquire the reply message sent by the server based on the unbinding request; and a controlling unit 702, configured to automatically send an unbinding request to the server after determining the reply message is unbinding failure.

In certain embodiment(s), the acquiring unit 701 is further configured to acquire list of user information and user selections fed back by the server that has a binding relationship with the image forming device, prior to acquiring the reply message sent by the server based on the unbinding request.

In certain embodiment(s), the controlling unit 702 is further configured to determine whether the reply message is unbinding failure based on the reply message and the user selection, after the acquiring unit acquires the reply message.

In certain embodiment(s), the controlling unit 702 is further configured to judge whether there is a binding relationship between the user information and the image forming device in the server, and when the binding relationship is determined to exist, to control the sending unit to send the unbinding request to the server.

In certain embodiment(s), the controlling unit 702 is further configured to set flag information built into the image forming device when the reply message indicates unbinding failure, and to determine to automatically send the unbinding request to the server based on the flag information.

In certain embodiment(s), the controlling unit 702 is configured to stop sending the unbinding request to the server when the obtaining unit obtains an instruction to terminate the unbinding request; or the control unit 702 is configured to stop sending the unbinding request to the server when it is determined that the reply message indicates that the unbinding is successful.

In certain embodiment(s), the acquiring unit 701 is configured to obtain an unbinding instruction, and the unbinding instruction includes a user information type; the sending unit 700 is configured to send the unbinding request to a server corresponding to the user information type based on the user information type; the acquiring unit 701 is configured to acquire the reply message sent by the server based on the unbinding request; and the controlling unit 702 is configured to automatically send the unbinding request to the server when the reply message indicates that unbinding fails.

Implementation Example Three

The present disclosure in certain embodiment(s) provides an image forming device, including the image forming control device described herein. The image forming control device provided according to certain embodiment(s) is used to implement the method described herein. Execution mode and beneficial effects may be similar, and are not repeated for brevity.

Implementation Example Four

Figure 8:
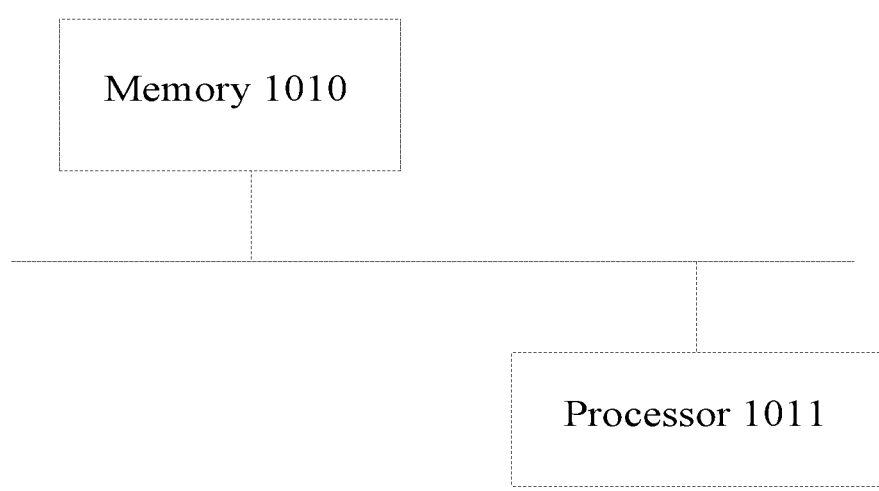
FIG. 8 schematically depicts a structure of an electronic device according to certain embodiment(s) of the present disclosure.

As shown in FIG. 8, the present disclosure in certain embodiment(s) provides an electronic device, including: a memory 1010, a processor 1011, and a computer program, where the computer program is stored in the memory, and is configured to be executed by the processor, based on the image forming device-based unbinding control method described herein.

The server provided according to certain embodiment(s) is used to execute the unbinding control method based on the image forming device described herein. The execution mode and beneficial effects may be similar, and are not repeated for brevity.

Implementation Example Five

In certain embodiment(s), the present disclosure provides a computer-readable storage medium on which a computer program is stored. When the program is executed, one or more of the steps of the image forming device-based unbinding control method described herein are implemented.

The computer program in the computer-readable storage medium provided by certain embodiment(s) is used to execute the unbinding control method based on the image forming device introduced herein. Execution mode and beneficial effects may be similar to what is described herein elsewhere, and are not repeated for brevity.

What is described herein is directed to certain embodiment(s) of the present disclosure, and is not intended to limit the present disclosure. Any modifications, equivalent replacements, and improvements made within the spirit and principles of the present disclosure are included the scope of protection of the present disclosure.

What is claimed is:

1. A method of unbinding control on an image forming device, the method comprising:

obtaining an unbinding instruction;
sending a first unbinding request to a server according to the unbinding instruction, wherein the unbinding request includes identification information of the image forming device;
obtaining a reply message from the server in response to the unbinding request;
in response to a determination that the reply message indicates unbinding failure, automatically sending a second unbinding request to the server;
prior to sending the first unbinding request to the server, determining whether an association relationship exists in the server; and
in response to determining that the association relationship is absent in the server, the first unbinding request is not sent.

2. The method of claim 1, further comprising:
obtaining from the server a list of one or more users each having a binding relationship with the image forming device; and
determining the reply message indicates unbinding failure according to the list of one or more users each having the binding relationship.

3. The method of claim 1, further comprising:
determining whether there is a binding relationship in the server between user information of a user and the image forming device; and
in response to a determination that the binding relationship exists, sending the first unbinding request to the server.

4. The method of claim 1, further comprising:
receiving a second reply message sent by the server in response to the second unbinding request; and
in response to a determination that the second reply message indicates unbinding success or unbinding operation aborted, stop sending further unbinding requests to the server.

5. The method of claim 1, wherein the unbinding instruction includes user information of a user, and the unbinding request is generated based on the user information of the user.

6. The method of claim 1, further comprising:
determining a first user and a second user each have a binding relationship to the image forming device;
determining the unbinding failure included in the reply message indicates a success on unbinding the first user and a failure on unbinding the second user; and
automatically sending the second unbinding request to the server, the second unbinding request includes a request to unbind the second user.

7. The method of claim 1, further comprising:
determining a first user and a second user each have a binding relationship to the image forming device;
receiving a user selection of one of the first user and the second user; and
including in the unbinding request information on the one of the first user and the second user.

8. The method of claim 1, wherein the image forming device comprises a preset flag, and wherein in response to the determination that the reply message indicates unbinding failure, automatically sending the second unbinding request to the server comprises:
setting a flag information in the preset flag to indicate unbinding failure;
sending the second unbinding request to the server based on the flag information;
after the second unbinding request is sent, obtaining the reply message from the server indicating whether the unbinding is successful; and
removing the preset flag in response to determining that the unbinding is successful.

9. The method of claim 1, when a binding relationship between a first user and the image forming device is released, a binding relationship between a second user and the image forming device is automatically released, wherein the binding relationship between the second user and the image forming device is determined based on corresponding user information shared by the first user.

10. An image forming device, comprising: a memory; and a processor coupled to the memory and configured to perform:
obtaining an unbinding instruction;
sending a first unbinding request to a server according to the unbinding instruction, wherein the unbinding request includes identification information of the image forming device;
obtaining a reply message from the server in response to the unbinding request;
in response to a determination that the reply message indicates unbinding failure, automatically sending a second unbinding request to the server;
prior to sending the first unbinding request to the server, determining whether an association relationship exists in the server; and
in response to determining that the association relationship is absent in the server, the first unbinding request is not sent.

11. The apparatus of claim 10, wherein the processor is further configured to perform:
obtaining from the server a list of one or more users each having a binding relationship with the image forming device; and
determining the reply message indicates unbinding failure according to the list of one or more users each having the binding relationship.

12. The apparatus of claim 10, wherein the unbinding request sent prior to receipt of the reply message is a first unbinding request, and the processor is further configured to perform:
determining whether there is a binding relationship in the server between user information of a user and the image forming device; and
in response to a determination that the binding relationship exists, sending the first unbinding request to the server.

13. The apparatus of claim 10, wherein the processor is further configured to perform:
receiving a second reply message sent by the server in response to the second unbinding request; and
in response to a determination that the second reply message indicates unbinding success, stop sending further unbinding requests to the server.

14. The apparatus of claim 10, wherein the processor is further configured to perform:
determining a first user and a second user each have a binding relationship to the image forming device;
determining the unbinding failure included in the reply message indicates a success on unbinding the first user and a failure on unbinding the second user; and
automatically sending the second unbinding request to the server, the second unbinding request includes a request to unbind the second user.

15. The apparatus of claim 10, wherein the processor is further configured to perform:
   determining a first user and a second user each have a binding relationship to the image forming device;
   receiving a user selection of one of the first user and the second user; and
   including in the unbinding request information on the one of the first user and the second user.

16. A non-transitory computer-readable storage medium storing computer program instructions executable by at least one processor to perform:
   obtaining an unbinding instruction;
   sending a first unbinding request to a server according to the unbinding instruction, wherein the unbinding request includes identification information of the image forming device;
   obtaining a reply message from the server in response to the unbinding request;
   in response to a determination that the reply message indicates unbinding failure, automatically sending a second unbinding request to the server;
   prior to sending the first unbinding request to the server, determining whether an association relationship exists in the server; and
   in response to determining that the association relationship is absent in the server, the first unbinding request is not sent.

17. The non-transitory computer-readable storage medium of claim 16, wherein the computer program instructions are further executable by the at least one processor to perform:
   obtaining from the server a list of one or more users each having a binding relationship with the image forming device; and
   determining the reply message indicates unbinding failure according to the list of one or more users each having the binding relationship.

18. The non-transitory computer-readable storage medium of claim 16, wherein the unbinding request sent prior to receipt of the reply message is a first unbinding request, and the computer program instructions are further executable by the at least one processor to perform:
   determining whether there is a binding relationship in the server between user information of a user and the image forming device; and
   in response to a determination that the binding relationship exists, sending the first unbinding request to the server.

19. The non-transitory computer-readable storage medium of claim 16, wherein the computer program instructions are further executable by the at least one processor to perform:
   receiving a second reply message sent by the server in response to the second unbinding request; and
   in response to a determination that the second reply message indicates unbinding success, stop sending further unbinding requests to the server.

20. The non-transitory computer-readable storage medium of claim 16, wherein the computer program instructions are further executable by the at least one processor to perform:
   determining a first user and a second user each have a binding relationship to the image forming device;
   determining the unbinding failure included in the reply message indicates a success on unbinding the first user and a failure on unbinding the second user; and
   automatically sending the second unbinding request to the server, the second unbinding request includes a request to unbind the second user.

* * * * *